United States Patent [19]

Turnbow

[11] 4,025,006
[45] May 24, 1977

[54] APPARATUS FOR DISPENSING HAY FROM LARGE ROUND BALES

[76] Inventor: Carrol E. Turnbow, Box 4000, Merritt, B. C., Canada

[22] Filed: June 5, 1974

[21] Appl. No.: 476,658

[52] U.S. Cl. .......................... 242/86.5 R; 214/766; 214/DIG. 4; 242/66
[51] Int. Cl.² .................. B65H 17/12; B65H 75/42
[58] Field of Search .......... 242/86.5 R, 86.52, 58.6, 242/75.1, 66, 55, 55.1; 214/766, 352, DIG. 4

[56] References Cited

UNITED STATES PATENTS

| | | | |
|---|---|---|---|
| 1,455,976 | 5/1923 | Stevens | 242/66 |
| 1,803,043 | 4/1931 | Valentine et al. | 242/66 |
| 3,356,341 | 12/1967 | Brown | 242/86.5 R |
| 3,473,755 | 10/1969 | Brown | 242/86.52 |
| 3,541,606 | 11/1970 | Martin, Sr. | 242/55 |
| 3,561,692 | 2/1971 | Henry | 242/55 |
| 3,779,208 | 12/1973 | Gay | 119/1 |
| 3,861,616 | 1/1975 | Dubberke | 242/86.5 R |
| 3,874,609 | 4/1975 | Larson | 242/86.5 R |
| 3,880,305 | 4/1975 | Polen | 214/DIG. 4 X |

Primary Examiner—Stanley N. Gilreath
Assistant Examiner—John M. Jillions
Attorney, Agent, or Firm—Christensen, O'Connor, Garrison & Havelka

[57] ABSTRACT

Disclosed is an apparatus for dispensing hay from large cylindrical bales formed of layers of hay spirally wound around a central axis. The preferred embodiment is comprised of a U-shaped frame detachably mountable on a three-point hitch of a tractor. The frame supports two rotatable, cylindrical rollers so oriented that a bale is supportable thereon. Powered rotation of one or both of the rollers causes the bale to rotate about its axis and the outermost layer of hay to be unwound from the bale and discharged between the rollers.

3 Claims, 4 Drawing Figures

APPARATUS FOR DISPENSING HAY FROM LARGE ROUND BALES

BACKGROUND OF THE INVENTION

This invention relates to apparatus for dispensing hay from large cylindrical bales formed of layers of hay spirally wound around a central axis. In a preferred aspect, the apparatus is also useful for transporting such bales. Unless otherwise indicated, the term "hay" as used herein includes legumes, grasses, straws and other baleable crops.

One type of hay baler that is experiencing ever-increasing popularity is that used to produce bales commonly referred to in the art as "large round bales." These bales are cylindrical in shape, are typically in the neighborhood of 5 to 6 feet in length and 4 to 6 feet in diameter and weigh from 500 to 2,000 lbs. or more, depending on the nature and moisture content of the hay. Because of their size and weight, these bales cannot be conveniently unrolled or otherwise unpackaged by hand. Consequently, there has been a need in the art for effective means of unpackaging these bales. U.S. Pat. No. 3,779,208 discloses several pieces of equipment for unrolling such bales across the ground.

SUMMARY OF THE INVENTION

This invention is directed to apparatus for dispensing hay from a cylindrical bale formed of layers of hay spirally wound about a central axis. (Such apparatus is sometimes referred to hereinafter merely as a "dispenser.") The apparatus comprises means for supporting such a bale above ground level and for rotating the supported bale about its central axis, the bale supporting and rotating means including at least one generally cylindrical, normally horizontal roller on which the bale is supportable and by which the bale is rotatable due to frictional engagement between the roller and the cylindrical surface of the bale. Preferably, the bale supporting and rotating means includes a second, cylindrical normally horizontal roller parallel to the first roller and so positioned relative thereto that a bale is supportable on the two rollers with its axis generally parallel to the axes of the rollers.

The presently preferred dispenser of the present invention comprises two rollers as described above, support means for supporting the rollers above ground level and power means for rotating at least one, and preferably both, of the rollers, thereby to effect rotation of the bale about its axis due to frictional engagement between the cylindrical surface of at least one of the rollers and the cylindrical surface of the bale. Preferably, the two rollers are spaceable apart to an extent that as the outermost layer of the bale separates from the remainder of the bale, it discharges downwardly between the two rollers onto the ground or onto a conveyor situated under the rollers. It is also preferred that the spacing between the rollers be variable so that the apparatus can accommodate bales of varying sizes, and so that as a given bale becomes smaller as hay is dispensed therefrom, the rollers can be moved closer together.

This invention is also directed to a bearing assembly useful in apparatus comprising a load member and a support member for supporting the load member wherein the members are moveable relative to one another in a direction generally parallel to a relatively smooth surface on one of the members. The purpose of the bearing assembly is to maintain separation between the two members thereby to minimize friction during relative movement thereof. The bearing assembly comprises a ball bearing contacting the smooth surface on one of the members and a tubular member extending generally normally to the smooth surface and having an open end forming a socket which contacts and contains a portion of the ball bearing. The internal dimension of the open end of the tubular member is less than the diameter of the bearing. The tubular member is connected to either the load member or the support member (preferably the former) and the bearing is in contact with the other such that the load member and support member are spaced apart and the weight of the load member is transmitted to the support member through the tubular member and ball bearing. Preferably, the tubular member is situated above the ball bearing and includes a passage through which a lubricant can be transmitted to the portion of the bearing contained in the open end. A bearing assembly as just described is used to advantage in the hay dispenser of this invention for reducing friction between certain parts that are moveable relative to one another.

BRIEF DESCRIPTION OF THE DRAWINGS

FIG. 4 is a vertical section view of a bearing assembly taken along line 4—4 of FIG. 1.

DETAILED DESCRIPTION OF THE DRAWINGS AND THE PREFERRED EMBODIMENTS

Figure 1:
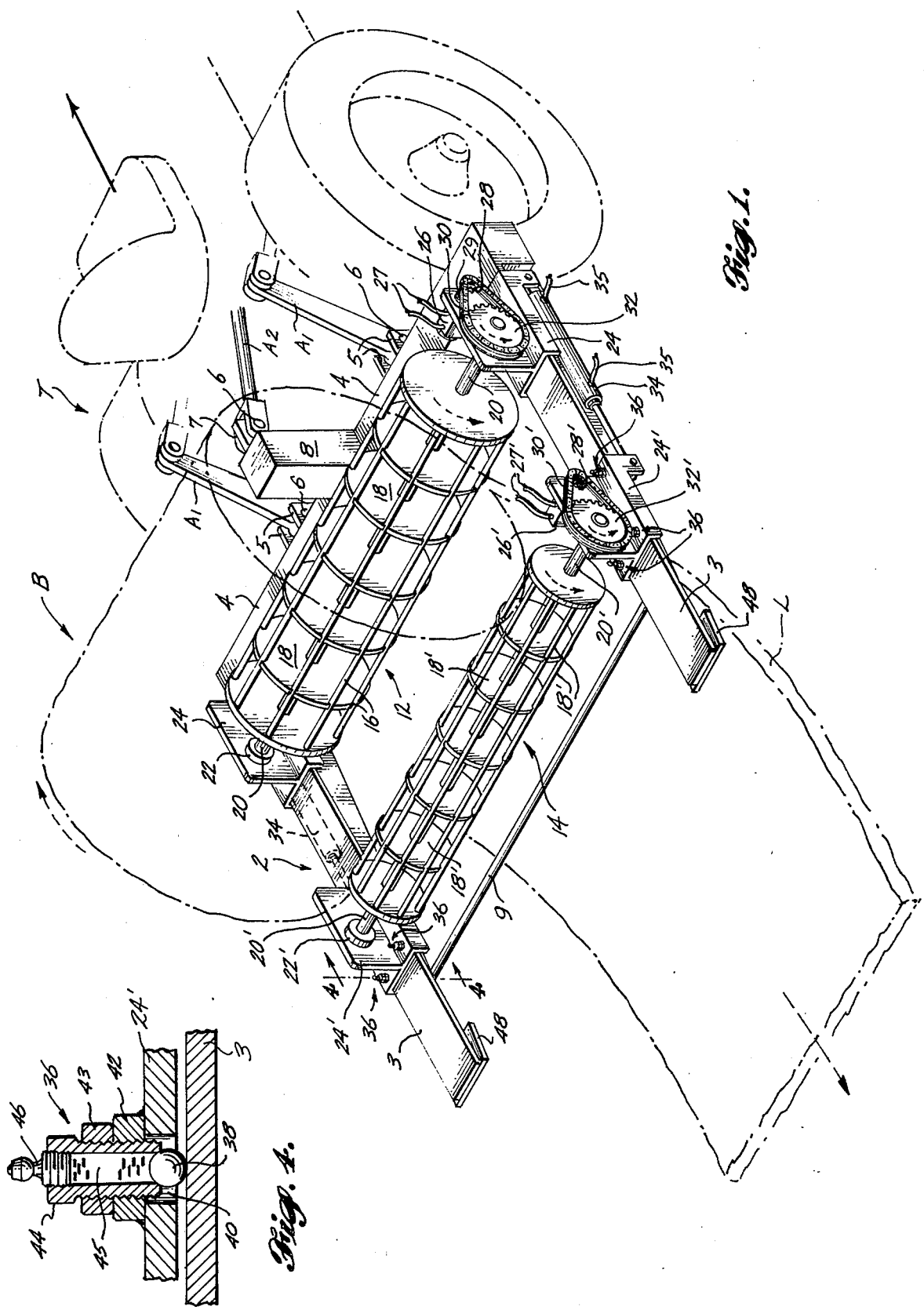
FIG. 1 is an isometric view of the presently preferred hay dispensing apparatus of this invention detachably mounted on the three-point hitch of a tractor. A large round hay bale (shown in outline only) is supported on the apparatus and hay is being dispensed therefrom.
Figure 2:
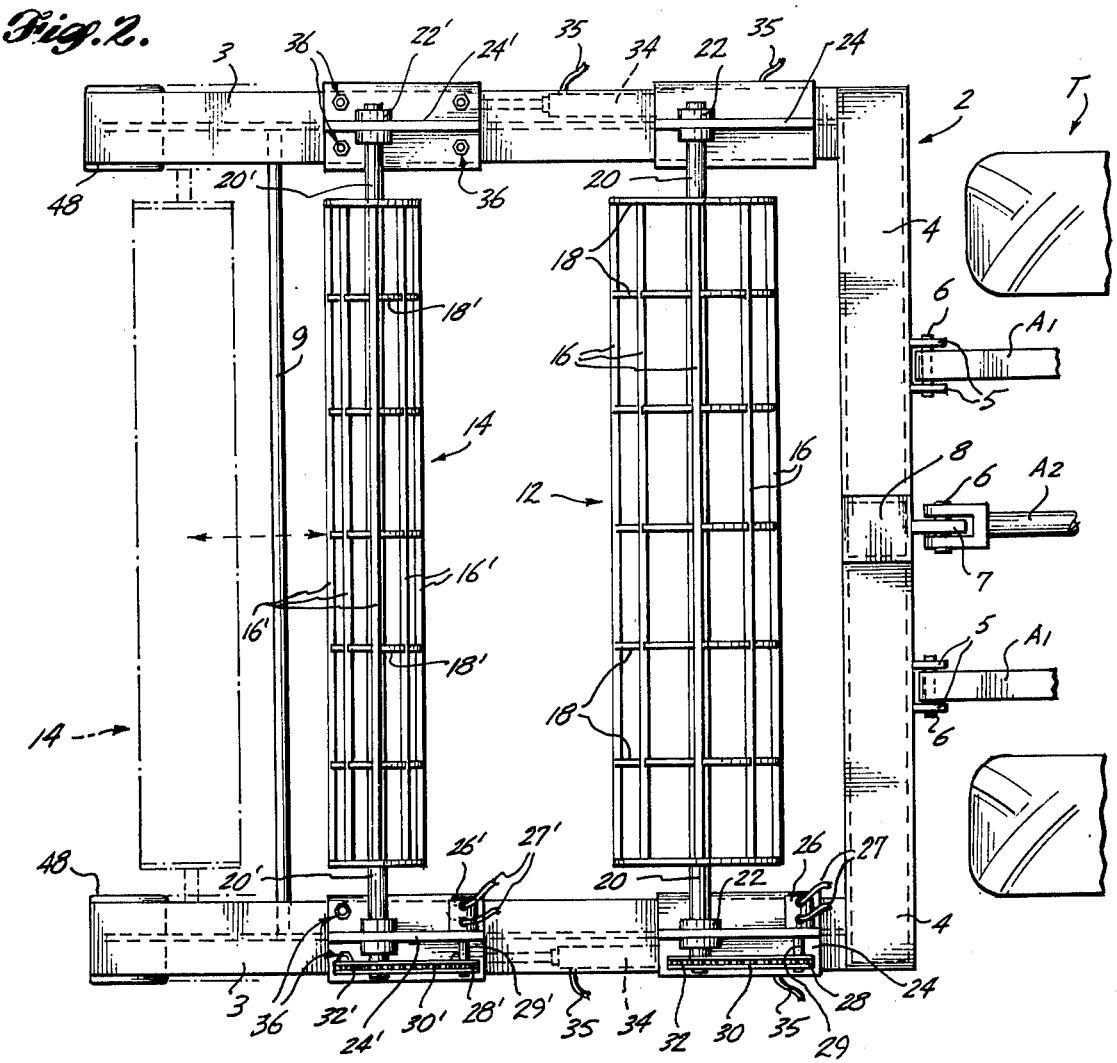
FIG. 2 is a plan view of the apparatus of FIG. 1; the bale is not shown.
Figure 3:
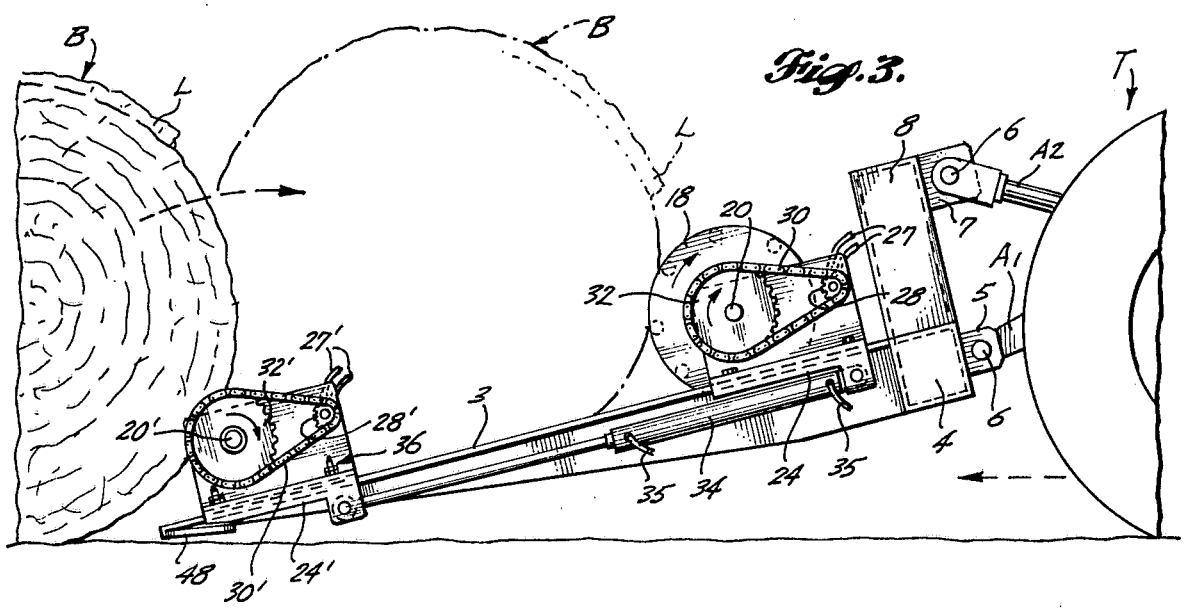
FIG. 3 is a side elevation view of the apparatus of FIG. 1 in position for loading a large round bale situated on the ground.

Referring to FIGS. 1-3 of the drawings, there is shown the presently preferred embodiment of the hay dispensing apparatus of this invention detachably mounted on a conventional three-point hitch of a farm tractor T. FIG. 1 depicts the hay dispensing mode of operation of the apparatus while FIG. 3 depicts the loading mode. In the following description, the elements of the apparatus will be described first and then the just-mentioned modes of operation.

Still referring to FIGS. 1-3, the hay dispensing apparatus includes a generally U-shaped or yoke-shaped frame, indicated generally at 2, comprised of two rearwardly extending, parallel rails 3 welded at their forward ends to a crossbar 4. Welded to the forward face of the crossbar are two pairs of plates 5. The plates in each pair are spaced apart so that the end of one of the two outer arms $A_1$ of the three-point hitch can be accommodated therebetween. A post 8 extends upwardly from the midpoint of the crossbar of the frame. Welded to the forward face of this post is a plate 7 which is disposed in a yoke at the end of the middle arm $A_2$ of the three-point hitch. Removable pins 6 extending through holes in plates 5 and 7 and through arms $A_1$ and $A_2$ connect the frame to the hitch. A spacer shaft 9, which extends between and is welded to the rails near their rearward ends contributes to the overall strength and rigidity of the frame.

Extending perpendicular to the rails are two large rollers, a front roller 12 and a rear roller 14. These rollers are generally cylindrical in shape and are situated with their axes parallel and normally horizontal. As shown in FIG. 1, the rollers are so positioned relative to one another that a bale is supportable thereon with its axis generally parallel to the axes of the rollers.

Each of the rollers is comprised of eight lengths of sturdy pipe 16 and 16' welded to the edges of seven circular, metal, spacer plates 18 and 18' equally spaced apart along axles 20 and 20' to which they are welded. The lengths of pipe are equally spaced apart around the spacer plates so as to provide the overall cylindrical shape of the rollers.

The roller axles extend through and beyond the endmost spacer plates and through bearings 22 and 22' in front and rear bearing blocks 24 and 24'. The bearing blocks are generally in the shape of inverted T's, with bearings 22 and 22' being disposed in the upwardly extending legs of the T's and the ends of the cross members of the T's being bent to form flanges which extend around and under the edges of the frame rails.

One of the front bearing blocks 24 and one of the rear bearing blocks 24' carry reversible hydraulic motors 26 and 26', the motors being connectible to the hydraulic system of the tractor by means of hydraulic conduits 27 and 27'. Power is transmitted from the motors 26 and 26' to the rollers by means of chain and sprocket drives consisting of small sprockets 28 and 28' on the motor output shafts 29 and 29', large sprockets 32 and 32' on the ends of the roller axles 20 and 20', and link drive chains 30 and 30' connected to the small and large sprockets. The direction of rotation of the output shaft of the motors, and hence the direction of rotation of the rollers, can be reversed by reversing the direction of flow of hydraulic fluid through conduits 27 and 27'.

The front bearing blocks 24 are welded to the forward ends of rails 3. The rear bearing blocks 24' can be moved along the rails between the two positions shown in FIG. 2 in order to vary the spacing between the front and the rear rollers.

To minimize friction during movement of the rear bearing blocks along the rails, each of these blocks is provided with four bearing assemblies 36 of this invention which maintain a separation between the undersides of the blocks and the topsides of the rails. (These bearing assemblies are discussed in more detail hereinafter.) The limited force necessary to move the rear bearing blocks is provided by two hydraulic piston and cylinder units 34 disposed between and connected to the front and rear bearing blocks. Hydraulic fluid is supplied to the units via conduits 35 which are connectible to the hydraulic system of the tractor.

In the preferred embodiment shown in the drawings, the front and rear rollers are about 6 feet in length and 18 inches and 9 inches in diameter, respectively. They are geared to rotate at similar peripheral speeds. The actual speed of rotation can be controlled by the operator by controlling the engine speed of the tractor.

The details of one of the bearing assemblies 36 are shown in FIG. 4. The assembly is comprised of a ball bearing 38 in contact with the flat, relatively smooth upper surface of a rail 3 and is contained within a hole 40 extending through the bearing block 24'. A large nut 42 is welded to the block co-axially with the hole. A length of pipe 44 threadedly engaged in the nut extends part way through hole 40. The internal diameter of the pipe is slightly less than the diameter of the ball bearing. The lower end of the tubing bears on and contains the upper portion of the ball bearing and thus serves as a race therefor. Disposed in the upper end of the tubing is a grease fitting 46 through which grease can be supplied to the pipe interior by means of a conventional grease gun. A lock nut 43 locks the threaded pipe in place and prevents undesired rotation thereof.

The bearing assembly just described is particularly easy to construct. A predrilled rear bearing block is disposed on the frame rail, a ball bearing is placed in each of the holes, and the lengths of threaded pipe are screwed into nuts 42 (which can be welded onto the bearing block before or after placement of the ball bearings). The pipes are advanced through nuts 42 by turning until the sliding blocks are separated from the associated rail to the desired extent. Once the desired separation is attained, the lock nuts 43 are tightened.

As the ball bearing 38 rolls along the upper surface of the rail, it becomes coated with a film of grease or another lubricant contained in the pipe. The purpose of the lubricant is of course to minimize friction between the ball bearing and the end of the pipe.

With four bearing assemblies disposed on each of the rear bearing blocks, as shown in FIGS. 1-3, very little force is required to slide the blocks along the rails, even when a 2,000 lb. bale is disposed on the rollers. Even during the dustiest and dirtiest conditions, the bearing assemblies require only periodic supplies of grease to function properly.

Referring now to FIG. 3 wherein a bale is shown being loaded onto the hay dispensing apparatus, it will be seen that the rearward end of the apparatus is lowered to a position at or just above ground level and the rear roller is moved to its rearmost position. With the rear roller rotating in a clockwise direction (as viewed in FIG. 3) the tractor is backed up to the bale such that the rear roller engages the underside of the bale as shown in solid lines. Backing of the tractor is then continued until the rear roller passes under the bale which then assumes the position shown in broken lines where it is supported on and between the front and rear rollers. Rotation of the rear roller and the wedging action of the rear end of the apparatus lift the bale sufficiently to allow the rear roller to pass under it. Skid plates 48 welded to the undersides of the rearward end of the rails prevent the ends of the legs from digging into the ground during the loading operation. To prevent the bale from rolling during the loading operation, it should be backstopped by one or more other bales or by some other means.

Once the bale has been loaded, rotation of the rollers is stopped, the apparatus is raised by means of the three-point hitch to the horizontal position shown in FIG. 1, and the tractor is driven to a location where the hay is to be dispensed. Referring to FIG. 1 which depicts unrolling of the bale to dispense hay therefrom, it will be seen that the rollers 12 and 14 are rotated counter-clockwise (as viewed in FIG. 1) and the bale is rotated clockwise. As will be noted from FIG. 3, the bale was loaded so that when it is rotated as shown in FIG. 1, the free end of the outermost layer of hay L tends to fall away from the remainder of the bale as it passes the front roller. Had the ends of the bale been reversed, then rotation of the rollers and bale in directions opposite to those indicated in FIG. 1 would cause the free end of the outermost layer to tend to fall away as it passed the rear roller. Orientation in the manner shown in FIG. 3 is preferred, however, because dispensing of hay is slightly more effective.

In some instances portions of the outermost layer may be so tightly adhered to the underlying layer that they will not simply fall away because of their own weight. When this occurs, alternating the direction of rotation of the front and rear rollers a few times will usually cause sufficient impacting of the rollers against the bale to cause separation to occur. At this point it should be mentioned that in contrast to what might be suggested by the drawings of bales in FIGS. 1 and 3, the weight of the bale actually causes it to be temporarily but substantially deformed in the areas contacting the rollers. This deformation is beneficial because it promotes separation of the outermost layer. It should also be mentioned that the width and thickness of the layer of hay that separates from the bale will correspond to the width and thickness of the windrow from which the bale was formed.

As the body of the bale diminishes in size as it is unwound, the rear roller is moved forward so as to narrow the gap between it and the front roller and thus prevent the bale from falling between the rollers before it is substantially completely unwound. It has been found that rotation of a bale at from about 30 to 50 R.P.M. results in hay being dispensed at a maximum rate. The optimum speed will depend on the nature of the hay and the diameter of the bale.

It is not essential that rotation of the rear roller be powered during the hay dispensing mode of operation. However, if the rear roller is to function as a bale-supporting "idler" it is preferable that the two rollers be more equal in size. Indeed, it is possible to support a bale entirely on only one large roller if suitable means (such as idler rollers) are provided on both sides of the bale to prevent its falling off. Hay dispensing using such an arrangement is very effective, but the "self-loading" capability is sacrificed.

It may already have become evident to the reader that the hay dispensing apparatus of this invention has many advantages when compared to the apparatus of the general type disclosed in the aforementioned U.S. Pat. No. 3,779,208. For example, when using apparatus of the present invention, a bale from which hay is being dispensed is supported above the ground, and dispensing of hay is independent of tractor movement. Consequently, hay can be deposited into low mangers or bunkers or in piles on the ground, and portions of a bale can be dispensed at widely separated locations without the need to load and then unload the bale. Another advantage is that bales are not pushed or rolled along the ground and the tractor wheels do not pass over the dispensed hay; this makes it possible to dispense hay on soft ground or snow and in the case of legume hays, minimizes separation of nutritious leaves from stems. Still further, using apparatus of this invention, there is usually no difficulty dispensing hay from lopsided or flattened bales and bales wherein layers are rather tightly adhered together. This is probably not the case with the mentioned prior art apparatus.

In FIG. 1, hay is shown being dispensed directly onto the ground. It will be apparent, however, that the apparatus can be readily modified to include a conveyor mechanism for catching the dispensed hay and discharging it into mangers, bunkers or other containers. Many other variations and modifications of the preferred embodiment shown in the drawings can be made without departing from the spirit and scope of this invention. For example, the apparatus could be mounted on a suitable trailer capable of carrying one or a plurality of bales. Such a trailer could be equipped with a conveying mechanism for depositing the bales one at a time onto the dispensing apparatus and could be pulled by a smaller tractor than is required for the preferred dispenser of this invention.

What is claimed is:

1. A portable apparatus for dispensing hay from a cylindrical bale formed of layers of hay wound about a central axis comprising: first and second generally cylindrical, horizontal rollers, said rollers being substantially parallel to one another, rotatable about their cylindrical axes and so positioned relative to one another that a bale is supportable thereon with the cylindrical axis of the bale generally parallel to the axes of the rollers; support means for supporting said rollers above ground level; reversible motor means for selectively rotating said rollers in either direction about their axes independently of movement of said apparatus to thereby effect axial rotation of a bale supported on said rollers; power means for moving one of said rollers relative to the other to vary the spacing therebetween, and positioning means for positioning the support means near ground level to facilitate loading of a bale on the rollers by engagement thereof with the underside of a bale.

2. A portable apparatus for dispensing hay from a cylindrical bale formed of layers of hay wound about a central axis comprising:

first and second generally cylindrical, horizontal rollers, said rollers being substantially parallel to one another, rotatable about their cylindrical axes and so positioned relative to one another that a bale is supportable thereon with the cylindrical axis of the bale generally parallel to the axes of the rollers;

support means for supporting said rollers above ground level, said support means including a generally U-shaped frame having an open end, said rollers extending between the legs of the frame, said first roller being positioned between said second roller and the closed end of said frame and said second roller being movable between a first location adjacent said first roller and a second location adjacent the open end of the frame;

reversible motor means for selectively rotating said rollers in either direction about their axes independently of movement of said apparatus to thereby effect axial rotation of a bale supported on said rollers;

power means for moving said second roller between said first and second locations; said second roller being so mounted on said frame that when the open end of the frame is positioned substantially at ground level, said second roller when at said second location is engagable with the underside of a bale resting on the ground, and positioning means for positioning said frame near ground level to facilitate loading of a bale on the rollers by engagement thereof with the underside of a bale.

3. The apparatus of claim 2 wherein said second roller is of a diameter substantially less than the radius of a bale.

* * * * *